United States Patent
Bushong et al.

(10) Patent No.: US 7,372,237 B2
(45) Date of Patent: May 13, 2008

(54) METHOD AND APPARATUS FOR REGULATING CHARGING OF ELECTROCHEMICAL CELLS USING CELL TEMPERATURE INCREASE RATE

(75) Inventors: William C. Bushong, Madison, WI (US); Viet H. Vu, Verona, WI (US); Michael Root, Little Canada, MN (US)

(73) Assignee: Rovcal, Inc., Madison, WI (US)

( * ) Notice: Subject to any disclaimer, the term of this patent is extended or adjusted under 35 U.S.C. 154(b) by 334 days.

(21) Appl. No.: 10/885,368

(22) Filed: Jul. 6, 2004

(65) Prior Publication Data

US 2005/0052160 A1    Mar. 10, 2005

Related U.S. Application Data

(60) Provisional application No. 60/484,751, filed on Jul. 3, 2003.

(51) Int. Cl.
*H01M 10/44* (2006.01)
*H01M 10/46* (2006.01)

(52) U.S. Cl. ..................................................... 320/150

(58) Field of Classification Search ................ 320/107, 320/112, 150
See application file for complete search history.

(56) References Cited

U.S. PATENT DOCUMENTS

| 5,652,500 | A  | 7/1997  | Kadouchi et al. |
| 6,204,639 | B1 | 3/2001  | Takano et al.   |
| 6,326,766 | B1 | 12/2001 | Small           |
| 2002/0070709 | A1 | 6/2002 | Small et al.   |

FOREIGN PATENT DOCUMENTS

EP    1 261 098 A2    11/2002

*Primary Examiner*—Edward H Tso
(74) *Attorney, Agent, or Firm*—Armstrong Teasdale LLP

(57) ABSTRACT

A rechargeable electrochemical cell charging system is provided having a thermistor that engages the negative cell terminal at a location remote from the negative charge contact. The thermistor outputs temperature data to a controller in the charger that determines the rate of cell temperature increase. When the increase reaches a predetermined predetermined rate, the charge to the cell is discontinued. The cell can also include an air moving system that circulates cool ambient air through battery compartment to cool the batteries being charged.

30 Claims, 6 Drawing Sheets

METHOD AND APPARATUS FOR REGULATING CHARGING OF ELECTROCHEMICAL CELLS USING CELL TEMPERATURE INCREASE RATE

CROSS-REFERENCE TO RELATED APPLICATIONS

This claims the benefit of U.S. provisional patent application No. 60/484,751 filed on Jul. 3, 2003, the disclosure of which is hereby incorporated by reference as if set forth in its entirety herein.

STATEMENT REGARDING FEDERALLY SPONSORED RESEARCH OR DEVELOPMENT

Not Applicable.

BACKGROUND OF THE INVENTION

The present invention relates generally to nickel rechargeable cells, such as nickel metal hydride (NiMH) cells, and more specifically to a method and apparatus for automatically reversibly terminating a cell charging process. This invention can also be employed in nickel cadmium (NiCd) cells.

For greater convenience and portability, many modern electrical appliances and consumer products can be operated to draw electric current from batteries of standard size and electrical performance. For convenience and economy, various rechargeable batteries have been developed, such as nickel metal hydride cells and the like.

Metal hydride cell technology provides excellent high-rate performance at reasonable cost when compared to nickel cadmium and lithium ion technology. Moreover, metal hydride cells have about a 50% higher volumetric energy density than NiCd cells and about equal to lithium ion cells. The internal chemistry of metal hydride rechargeable cells has an impact on the ability to charge such cells. Issues affecting the ability to charge nickel rechargeable cells arise as a result of the internal chemistry of such cells. When a nickel rechargeable cell approaches a full charge state, oxygen is generated at the positive electrode as follows:

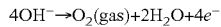
$$4OH^- \rightarrow O_2(gas) + 2H_2O + 4e^-$$

The oxygen gas diffuses across a gas-permeable separator to the negative electrode where it is recombined into cadmium hydroxide or water as follows:

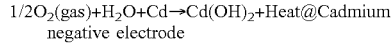
$$1/2 O_2(gas) + H_2O + Cd \rightarrow Cd(OH)_2 + Heat @ Cadmium$$
negative electrode

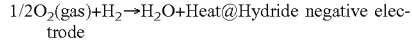
$$1/2 O_2(gas) + H_2 \rightarrow H_2O + Heat @ Hydride \text{ negative electrode}$$

When recharging such cells, it is important to ascertain when the cell has become fully charged. For example, if a cell were to become overcharged for an extended period of time, the pressure buildup within the cell could cause the cell to fail as well as electrolyte to leak, thereby further subjecting the charger to potential damage.

Metal hydride rechargeable cells are typically recharged by applying a constant current rather than constant voltage to the cells. In this scheme, cell voltage increases gradually until the cell approaches full charge whereupon the cell voltage peaks. As the cells reach the overcharge state, the released heat causes the cell temperature to increase dramatically, which in turn causes the cell voltage to decrease.

Cell pressure also rises dramatically during overcharge as oxygen gas is generated in quantities larger than the cell can recombine. Thus, conventional constant current charge interruption methods cannot support a very fast charge rate without risking internal pressure buildup, rupture, and electrolyte leakage. For this reason, metal hydride cells can be provided with safety vents.

With constant voltage charge, on the other hand, the charging current is high at the beginning of the charge, when the cell can accept higher currents, and then decreases to lower levels as the cell approaches full charge. When constant voltage charging, the above-noted signals for the end of a constant current charge process are not useful because as the cell approaches the full charge state, the cell voltage becomes constant. Like a constant current charge approach, charging time cannot be used for the constant voltage charge when the charge rate is higher than 0.3 C due to runaway accumulation of in-cell pressure that can damage devices. As a result of these shortcomings it has been difficult to identify an effective termination signaling means and constant voltage charging for metal hydroxide cells has therefore been generally considered to be impractical.

With alternating current charge, the charging current can be modulated at a defined frequency or combination of frequencies to produce a net positive current that enables the cell to become charged. An alternating current charge can provide a fast charge with less pressure buildup and lower temperature increase than constant current or constant voltage charge. However, when using an alternating current charge, the above-noted signals for the end of a constant current charge process are not useful because as the cell approaches the full charge state, changes in the cell voltage are difficult to detect above the voltage response to the applied alternating current. As a result it has been difficult to identify an effective termination signaling means and alternating current charging for metal hydroxide cells has also therefore been generally considered to be impractical. It should be appreciated that an alternating current charge is used throughout the present disclosure to mean a varying current that produces a net positive charge, such as a modulated alternating current. For example, an alternating current can be half-wave rectified or full-wave rectified to produce a series of current pulses, or an alternating current can be offset by a desired DC current.

One common way to reduce pressure buildup at the full-charge state is to provide a negative electrode having an excess capacity of greater by 40-50% more than the positive electrode, a gas-permeable separator, and limited electrolyte to accommodate effective diffusion of gasses. This avoids the production of hydrogen gas at the negative electrode while permitting the oxygen to recombine with the negative electrode material. When a cell reaches full charge, oxygen gas continues to be produced at the positive electrode, but hydrogen is not produced from the negative electrode. If hydrogen were produced, the cell could rupture from excess pressure. The oxygen recombination reaction therefore controls the cell pressure. The oxygen gas then crosses the separator and reacts with the negative electrode material. Downsides of this arrangement include reduced cell capacity and corresponding shorter cell cycle life due to degradation of the negative electrode from overcharge with oxidation and heat.

Charge termination based on peak voltage can be unreliable at the end of the charging period because an overvoltage condition can exist before termination. Termination based on a voltage decline (−dV) is necessarily associated with oxygen recombination and the accompanying detrimental temperature rise. In practice, this means that voltage detection must be accurate and fast. Unless the ambient temperature is steady, it can be difficult to accurately measure a change in voltage. Moreover, when the charge rate is slower than 0.3 C, the voltage drop measurement is too small to be detected accurately. A charge rate of 1 C draws a current equal to the rated capacity of the electrochemical cell or battery. Termination based only on peak temperature is also easily affected by ambient temperature changes.

Others in the art have sought pressure-based mechanisms for reversibly breaking the connection between the electrode and the cell terminal when internal cell pressure exceeds a predetermined level. Such systems have proven useful for their intended purpose, but require volume-occupying components to be installed in the cell.

Still others have attempted to determine a charging termination point based upon the rate of change in temperature over time (dT/dt). This charging method is useful because an increase in temperature slope provides an indication that cell charging should be terminated prior to an indication based on absolute temperature. Charge can thus be terminated before damaging pressure accumulates within the cell. Accordingly, there is a reduced risk of cell rupture and leakage in a dT/dt method when compared to the other methods noted above. This makes it the most common charge termination method in use today.

Conventional battery packs include thermistors that are attached to the sides of the cells disposed in the packs. A processor in the charger receives the temperature data and determines the rate of temperature change over time (dT/dt). Once dT/dt exceeds a specified threshold, the charger discontinues current to the battery pack. Because the sides of the cells in battery packs are typically conductive, the heat transfer rates from the cell interior to the thermistor are sufficient for the thermistor to provide a suitable indication of thermal behavior inside the charger. The processor is thus able to produce a reliable indication of the charge termination point based on temperature increase.

Single cells (i.e., cells not in battery packs), however, typically have insulating labels around the outer surface of the can to enable safe handling. The labels also provide decreased heat transfer rates from the interior of the cell. Thermistors therefore may not be placed at the side of individual cells if meaningful temperature data is to be obtained. Accordingly, conventional conventional charge methods for round cells mount a thermistor directly on the charge contact that engages the negative end of the cell. Heat transfer rates between the cell interior and the conductive negative end of the cell have proven suitable for use with the thermistor. However, high charging currents also pass through the contacts that generate a significant amount of IR heat that is emitted by the charge contacts and sensed by the thermistor. As the temperature of the thermistor increases, the measurement variations in temperature slope become increasingly unreliable. The resistance of the interface between the charge contact and cell being charged coupled with the additional IR heat that is produced interferes with the thermistor's ability to accurately determine the rate of temperature change at the negative end of the cell. Accordingly, conventional chargers measuring single cell temperatures do so with low sensitivity to temperature change, and are thus unable to determine a charge termination point prior to the accumulation of potentially damaging internal cell pressure.

In summary, as a single (i.e., not in a battery pack) metal hydride rechargeable cell reaches its fully charged state, oxygen is evolved from the positive electrode, thereby increasing the internal cell pressure and driving the exothermic oxygen recombination reaction. At a very high constant current charge rate, usually less than one hour, charge current is still very high at the end of charge. This results in severe heating of the cell and shortened cycle life. The available methods of terminating constant current charge of single cells based on rate of temperature change have not proven to be reliable due to the placement of the thermistor along with the significant amount of heat generated at the negative end of the cell.

What is therefore needed is a method and apparatus for reliably determining a charge termination point relying on a measured change of temperature over time. It would be further desirable to reduce the thermal effects of charging on the electrochemical cell being charged in order to prolong the charging cycle.

BRIEF SUMMARY OF THE INVENTION

In one aspect of the invention, a battery charger is provided of the type that delivers a charge to an electrochemical cell. The charger includes at least one battery compartment that receives the electrochemical cell. The battery compartment includes a positive charge contact engaging a positive cell terminal, and a negative charge contact engaging a negative cell terminal. A thermistor is provided that engages the negative cell terminal at a position remote from the negative contact. The thermistor provides data output to a controller for determining a temperature rate increase of the cell.

The foregoing and other aspects of the invention will appear from the following description. In the description, reference is made to the accompanying drawings, which form a part hereof, and in which there is shown by way of illustration, and not limitation, a preferred embodiment of the invention. Such embodiment does not necessarily represent the full scope of the invention, however, and reference must therefore be made to the claims herein for interpreting the scope of the invention.

DETAILED DESCRIPTION OF THE PREFERRED EMBODIMENT

Figure 1:
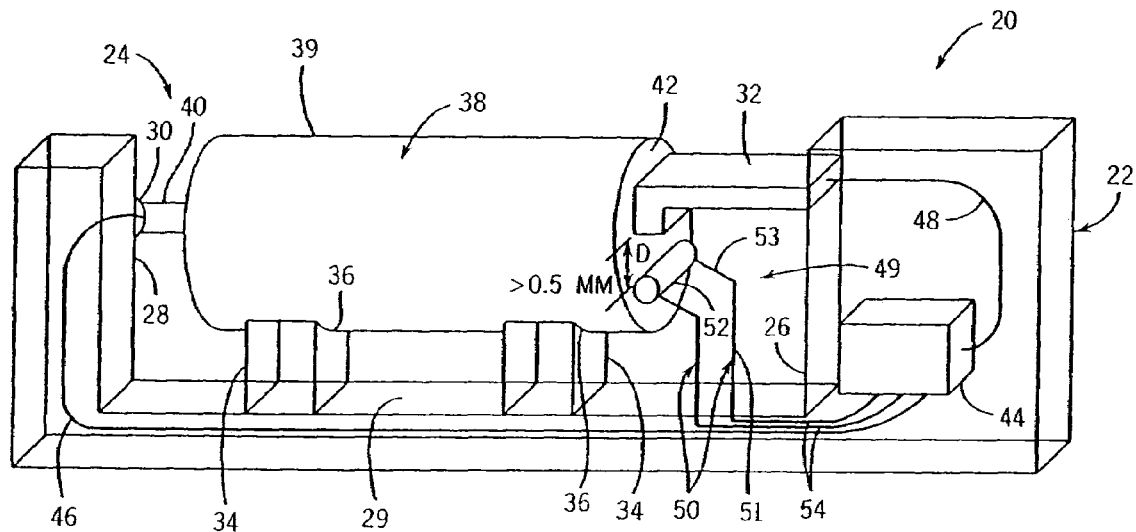
FIG. 1 is a schematic view of an electrochemical cell installed in a cell charger that terminates charge based on rate of cell temperature change over time in accordance with the preferred embodiment.

Referring to FIG. 1, the present invention recognizes that a useful indication that a charge to a cell should be terminated can include a measurement of a predetermined increase in cell temperature over a predetermined period of time. An axially extending charger 20 is thus provided including a housing 22 that encloses a battery-charging compartment 24. Compartment 24 includes a negative end wall 26 and an opposing positive end wall 28 extending upwardly from a base 29. A positive charge contact 30 extends into compartment 24 from the positive end wall 28, and a negative charge contact 32 extends into the compartment 24 from negative end wall 26. It should be appreciated that either, or both, of contacts 30 and 32 can be axially adjustable so as to engage any size cylindrical cell, including AAA, AA, A, C, D, 4/3 AAA, 5/4 AAA, 1/3 AAA, 2/3 AAA, 5/3 AAA, 4/5 A, 2/3 A, 4/3 FA, 4/5 AA, 2/3 AA, 7/5 AA, 1/3 AA and 1/3 N size cells.

A pair of supports 34 extends upwardly from the base 29 and has a curved upper surface 36 to provide a cradle for a rechargeable electrochemical cell 38 (such as a nickel metal hydride cell) that is installed in the compartment 24. Cell 38 is of the standard commercial type having an insulating label 39 that surrounds a conductive can (not shown). Cell 38 includes a positive terminal 40 that engages positive contact 30, and a negative terminal 42 that engages negative contact 32 in the usual manner. Cell 38 is illustrates as a AAA size cell in FIG. 1.

A controller 44, preferably in the form of a microprocessor, is installed in the housing 22 and is connected to positive contact 30 via a positive electrical lead 46. Controller 44 is further connected to negative contact 32 via a negative electrical lead 48. Charger 20 further includes a temperature increase rate measurement system 49 that determines a charge termination point based on the increase of cell temperature as a finction of time. In particular, a pair of legs 50 extends generally upwardly from base 29 at a proximal end 51, and supports any suitable thermistor 52 at a distal end 53. Specifically, proximal end 51 extends vertically upwardly from base 29, while distal end 53 is angled and extends upwardly and inwardly towards the interior of compartment 24.

Legs 50 are sufficiently flexible so as to bias thermistor 52 towards the negative terminal 42 of the cell 38. Legs 50 are configured to place thermistor 52 in contact with the negative terminal 42 at a position spaced from the interface between negative terminal 42 and negative contact 32 by a predetermined distance D. Because terminal 42 is conducting, the temperature experienced at thermistor 52 is similar to the temperature inside cell 38. Thermistor 52 could alternatively be positioned in contact with the positive terminal 40, however negative terminal 42 has a greater surface area and is thus the preferred location for thermistor 52.

Distance D is determined based upon the temperature profile typically experienced at the negative end of the cell 38 during charging. In particular, the present invention recognizes that a significant amount of IR heat is generated and emitted by the negative charge contact 32 due to the high charging currents passing through the contact 32. Furthermore, the resistance of the interface between charge contact 32 and negative terminal 42 produces additional heat. Distance D has been selected to thermally isolate the thermistor 52 from the above-described heat sources sufficiently such that the temperature at thermistor does not affect thermistor sensitivity during operation. In accordance with the preferred embodiment, D can be any distance greater than 0.5 mm depending on the diameter of the negative end of the cell 38, which, of course, is a function of cell size.

Thermistor 52 is therefore said to be located "remote" from negative charge contact 32, which means that the temperature at thermistor is not substantially increased by heat produced at contact 32, and the interface between terminal 42, to an extent that would adversely affect thermistor operation. Because cell 38 is a AAA size cell, it should be appreciated that contact 32 and thermistor 52 would engage larger cells having correspondingly larger negative ends. Legs 50 are conducting, and connected at the proximal end 51 to controller 44 via electrical leads 54.

During operation, controller 44 applies a constant current charge on the order of 4 amps to AAA cell 38 (which can vary depending on the cell size). During charging, controller 44 constantly applies a current through thermistor 52 and measures the corresponding voltage drop across thermistor 52, it being appreciated that thermistor resistance varies during operation as a function of thermistor temperature. Controller 44 also continuously calculates the rate of temperature change over a period of time (also referred to herein as "temperature slope" or "dT/dt"), it being appreciated that an identifiable predetermined increase in temperature slope precedes damaging internal cell pressure accumulation.

Accordingly, if cell charging terminates (or a maintenance charge along the lines of 10-300 milliamp hour is applied after the charging current is discontinued) upon realization of the predetermined temperature slope, damaging internal cell pressure accumulation can be avoided. Furthermore, the charge termination method based on dT/dt is easily reversible, that is a charging current can be reapplied to the cell, if desired, upon the occurrence of a predetermined indicator, such as passage of time, measurement of a predetermined temperature at thermistor 52, and the like. While a constant current charge is applied to cell 38 in accordance with the preferred embodiment, it should be appreciated that a constant voltage, alternating current, or alternating voltage charge can alternatively be applied to the cell and terminated in the manner described herein.

It should furthermore be appreciated that while one cell 38 is illustrated as being charged by charger 20, a plurality of cells are typically disposed in cell charging compartment 24 as described above, each having a dedicated thermistor 52 positioned as described above. The charging current can be controlled for each individual compartment 24 within charger 20 or for compartments arranged in an electrically parallel or series fashion. For conditions where cells are charged in parallel or series, the cell charge termination can be defined by the criteria established for any individual thermistor or for a calculation based upon information from multiple thermistors combined. Controller 44 can terminate charging to all cells when the temperature slope of one of the cells exceeds a predetermined threshold that indicates a charge termination point. Alternatively, controller 44 terminates the charge only to those select cells whose temperature increase exceeds the predetermined threshold to ensure that each cell undergoes a full charging cycle.

Figure 2:
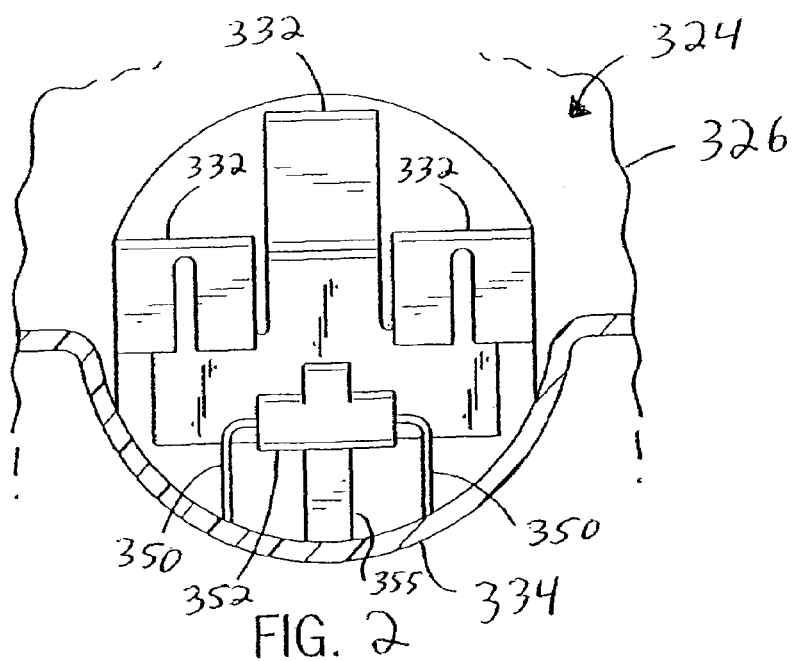
FIG. 2 is an end elevation view of a charging compartment of a charger constructed in accordance with an alternate embodiment.

Referring now to FIG. 2, the negative end of compartment 24 is illustrated in accordance with an alternate embodiment wherein reference numerals corresponding to like elements of FIG. 1 have been incremented by 300 for the purposes of clarity and convenience. In accordance with the illustrated alternate embodiment, a plurality of negative charge contacts is disposed inwardly from end wall 326, and can be mounted to a base 334 inside compartment 324 whose upper surface defines a cradle shaped to conform to the cylindrical outer wall of a battery being charged. In particular, an upper negative charge contact 332 is disposed above (and laterally between) a pair of negative charge contacts 332 such that at least one of the charge contacts 332 can engage cells of varying sizes that are disposed in charger 320. Thermistor 352 is supported by a flexible beam 355 extending up from base 334 that biases thermistor 352 towards the negative terminal 342 of the cell 338. As described above with reference to FIG. 1, beam 355 is configured to place thermistor 352 in contact with the negative terminal 342 at a position spaced from the interface between negative terminal 342 and negative contact 332 by a predetermined distance. A pair of electrical leads 350 connects thermistor 352 with a controller (not shown).

Figure 3A:
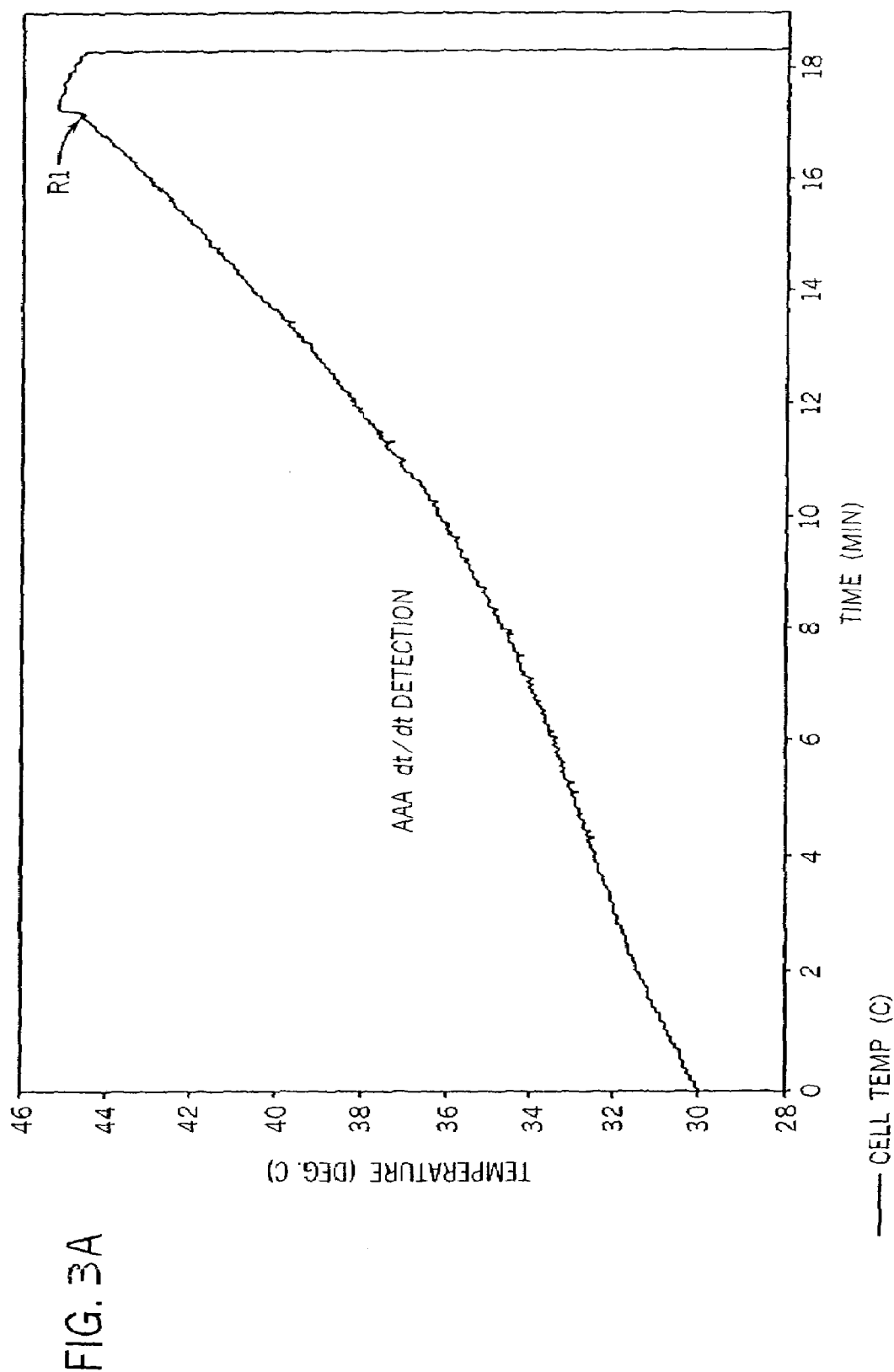
FIG. 3A is a graph illustrating empirically derived data related to cell temperature as a function of time during a charge cycle.
Figure 3B:
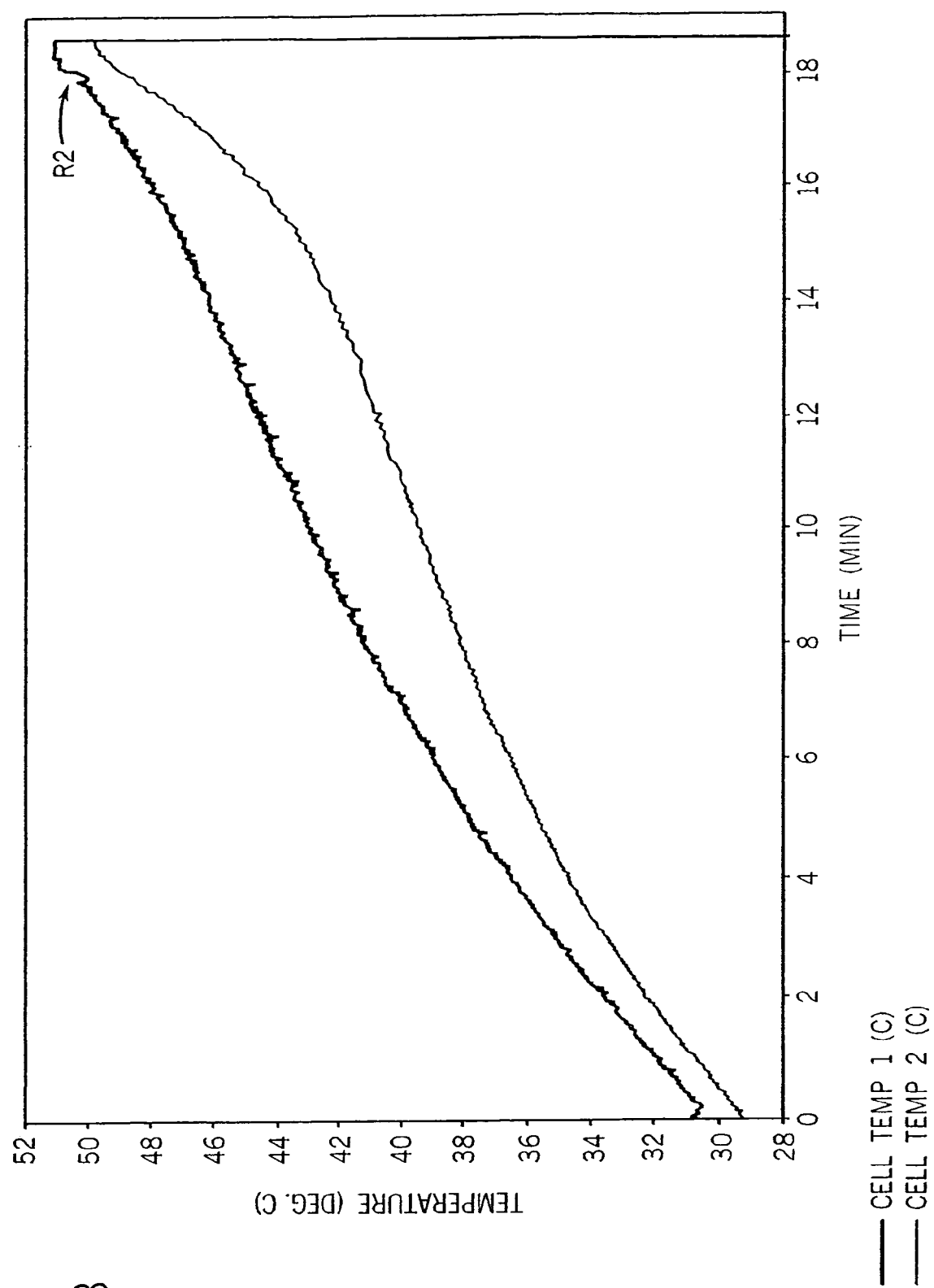
FIG. 3B is a graph illustrating empirically derived data related to temperature of a pair of cells being charged as a function of time during a charging cycle.

Referring now to FIGS. 3A and 3B, temperature data is plotted as a function of time for a AAA size nickel metal hydride cell (FIG. 3A) and a pair of AAA size nickel metal hydride cells (FIG. 3B) during charging in a charger having a temperature measurement system as described above. All three cells experienced a substantial temperature increase rate before the expiration of approximately 18 minutes of charging. Specifically, the cell illustrated in FIG. 3A experienced its temperature increase rate R1 at approximately 17 min. Cell 2 illustrated in FIG. 3B experienced its temperature increase rate R2 at approximately 18 min. The charge current to cell 1 was also terminated once cell 2 experienced its temperature increase rate because they were being charged in an electrically parallel fashion. Temperature increase rates R1 and R2, and similar measurements, can be used to empirically determine the predetermined cell temperature increase rate that is used to discontinue charging.

It has been determined that a full charge cycle in accordance with the preferred embodiment can advantageously be completed in a time duration as low as 15 minutes or less, depending upon uncharged cell capacity, cell size, internal cell impedance or charging current. The charging current to the cells whose data appears in FIGS. 3A and 3B was terminated when controller 44 determined that the rate of temperature increase surpassed 2 degrees C. per minute. It should be appreciated that the predetermined temperature slope can be anywhere between 1 degree per minute and 5 degrees per minute depending on the rate of cell cooling, the rate of cell charging and the specific cell chemistry being charged. One skilled in the art could determine a reliable significant temperature slope to signify charge termination depending on these factors. The present invention, however, is not to be limited to such slopes unless otherwise indicated.

Figure 4:
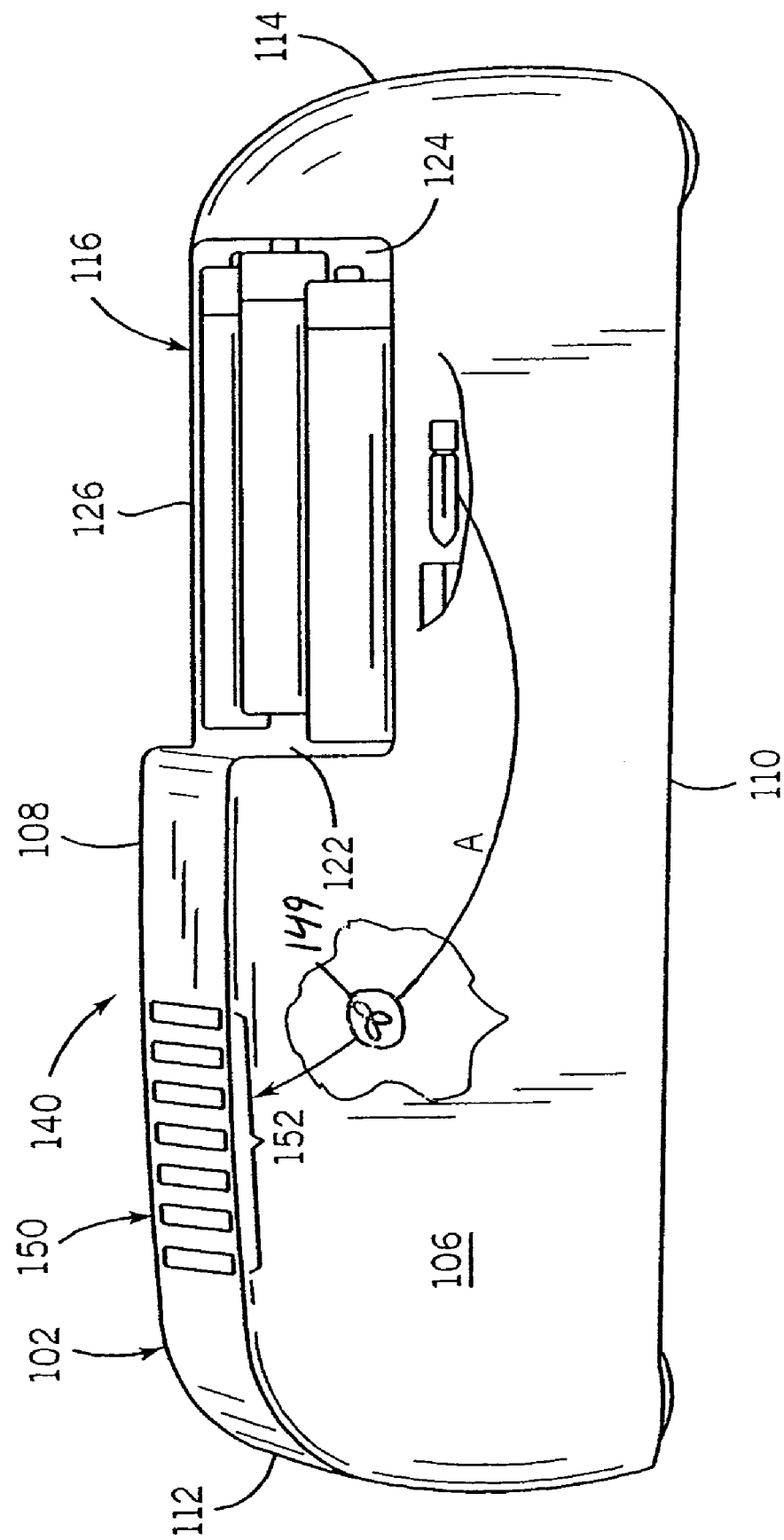
FIG. 4 is a is a perspective view of a charger illustrated incorporating an air moving system in accordance with an alternate embodiment of the invention.
Figure 6:
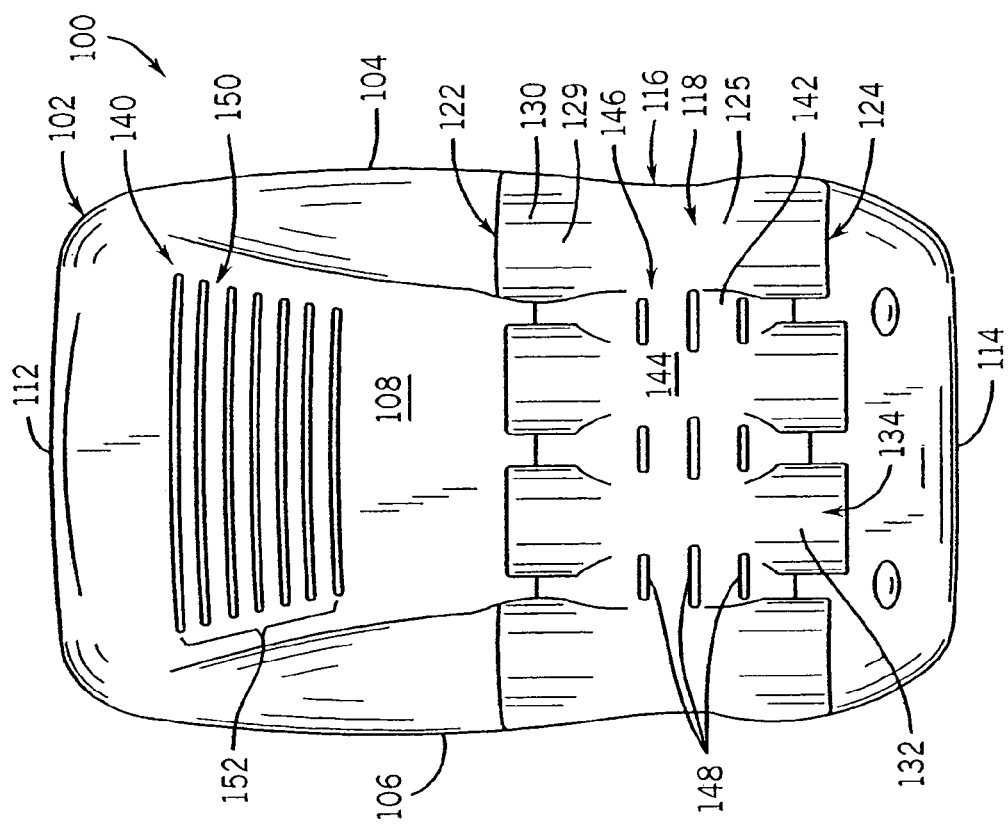
FIG. 6 is a view similar to FIG. 4 but with the batteries removed.
Figure 5:
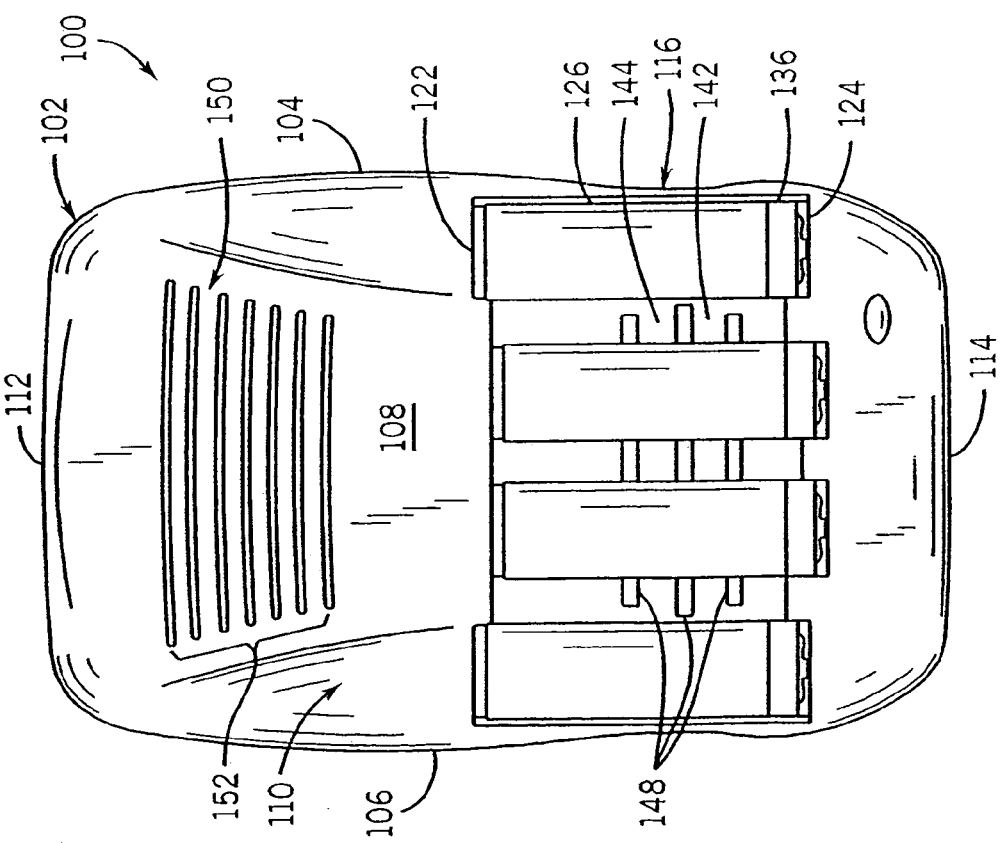
FIG. 5 is a top plan view of the charger illustrated in FIG. 3.

Referring now to FIGS. 4-6, an axially extending charger 100 is presented in accordance with an alternate embodiment of the invention. Charger 100 includes a housing 102 defined by axially extending side walls 104 and 106, upper wall 108, base 110, and first and second laterally extending end walls 112 and 114, respectively. Second end wall 114 is disposed axially downstream of the first wall 112. An electrical lead (not shown) extends from housing 102 and has a standard plug that is received by an electrical receptacle to provide power to the charger 100. Charger 100 is designed to rest on a table or a like flat surface.

A void is formed in the upper wall 108 proximal the second end wall 114 that provides a battery compartment 116. The battery compartment 116 includes a plurality of axially extending grooves 118 (four grooves illustrated), each of which is sized to receive a rechargeable battery 126. Each groove 118 is defined by a first end wall 122 and a second end wall 124 disposed downstream from the first end wall, and a base 125 whose upper surface defines a cradle 125 that conforms to the cylindrical outer wall of a battery 126. Specifically, the battery 126 is inserted into a groove 118 such that the positive end interfaces with the first end wall 122 and the negative end interfaces with the second end wall 124.

A plastic or other nonconductive plug 130 extends into each groove 118 from positive end wall 122, and is spring loaded to enable the plug to adjust its axial position depending on the length of the inserted battery 126. The plug defines a circular bore at its axially outer face that is sized to receive the nubbin of the battery 126, such that a positive electrical contact 129 disposed in the bore engages the positive end of the battery. Charger 100 further includes a temperature rate increase measurement system, including a negative charge contact (not shown) and thermistor (not shown) as described above with reference to FIG. 1 for applying a charge current to the battery 126 and measuring the corresponding temperature rate increase as a function of time, as described above.

Charger 100 includes an air moving system 140 that circulates cool ambient air through battery compartment 116. The circulating air cools batteries 126, thereby providing more accurate thermistor readings, and possibly also extending the charge capacity of the cell by enabling a more accurate endpoint to cell charging compared to conventional chargers. Air moving system 140 enables the reduction of excessive temperatures that are typically associated with conventional cells during charging. In particular, a shelf 142 is disposed between adjacent grooves 118, and defines a substantially horizontal upper face 144. An air intake vent 146 includes a plurality of slots 148 that extend laterally through the upper face 144 of each shelf 142. Slots 148 are recessed with respect to the battery 126. An air outlet vent 150 includes a plurality of slots 152 that extend laterally through the upper wall 108 proximal end wall 112. The interior of the charger 100 is sufficiently hollow so as to provide an internal conduit between vents 146 and 150.

A forced air source 149 is disposed inside the charger 100, preferably inside a conduit at a location between vents 146 and 150, suitable to force air disposed inside the housing 102 out of the housing via vent 150. The expulsion of air from vent 150 creates a negative pressure in battery compartment 116 that forces cool ambient air into compartment via vents 146. Air thus flows along the direction of Arrow A from vents 146 and through housing 102, and exits the charger 100 at vent 150. Because each vent 146 is disposed adjacent battery 126 and recessed with respect to the battery, cooling ambient air flows around that portion of the outer circumference of the battery that is disposed outwardly with respect to vent 146. Batteries 126 are thus air-cooled. The air moving system 140 thus prevents hot air from accumulating around the individual cells being charged, and thus extends the charge capacity of the cell. While the interior of housing 102 is sufficiently hollow to place vents 146 and 150 in fluid communication, it should be appreciated that a conduit (not shown) can be constructed inside housing 102 that connects vents 146 and 150 at its outer ends. The forced air source would be disposed in the conduit to produce airflow in the desired direction. It should be appreciated that while a negative pressure is produced in battery compartment 116, the air flow could be reversed such that air enters vents 150 and exits housing battery compartment 116 at vents 146.

The air moving system and temperature rate increase measurement system can be used either alone or in combination in a charger of the type described herein. It should be further appreciated that the forced air source can be a fan disposed in the housing 102 at a location proximal vents 150, or alternatively can comprise any apparatus operable to cause air to flow between vents 146 and 150. It should furthermore be appreciated that the flow of air can be reversed, such that air is received into the housing 102 at vent 150 and exits the housing at vents 146. Furthermore, while ambient air flows past the cells in a direction generally transverse to the charger 100, the air could alternatively flow through the battery compartment 116 in a lateral direction, an axial direction, under the batteries 126, around the batteries, or alternatively vents 146 can be configured to form a swirl of air in the battery compartment 116. The configuration of vents 146 is thus only one of several possible configurations understood by one having ordinary skill in the art that are intended to fall under the scope of the present invention. Any such vent configuration can further be installed in charger 20 described above with reference to FIG. 1.

Figure 7:
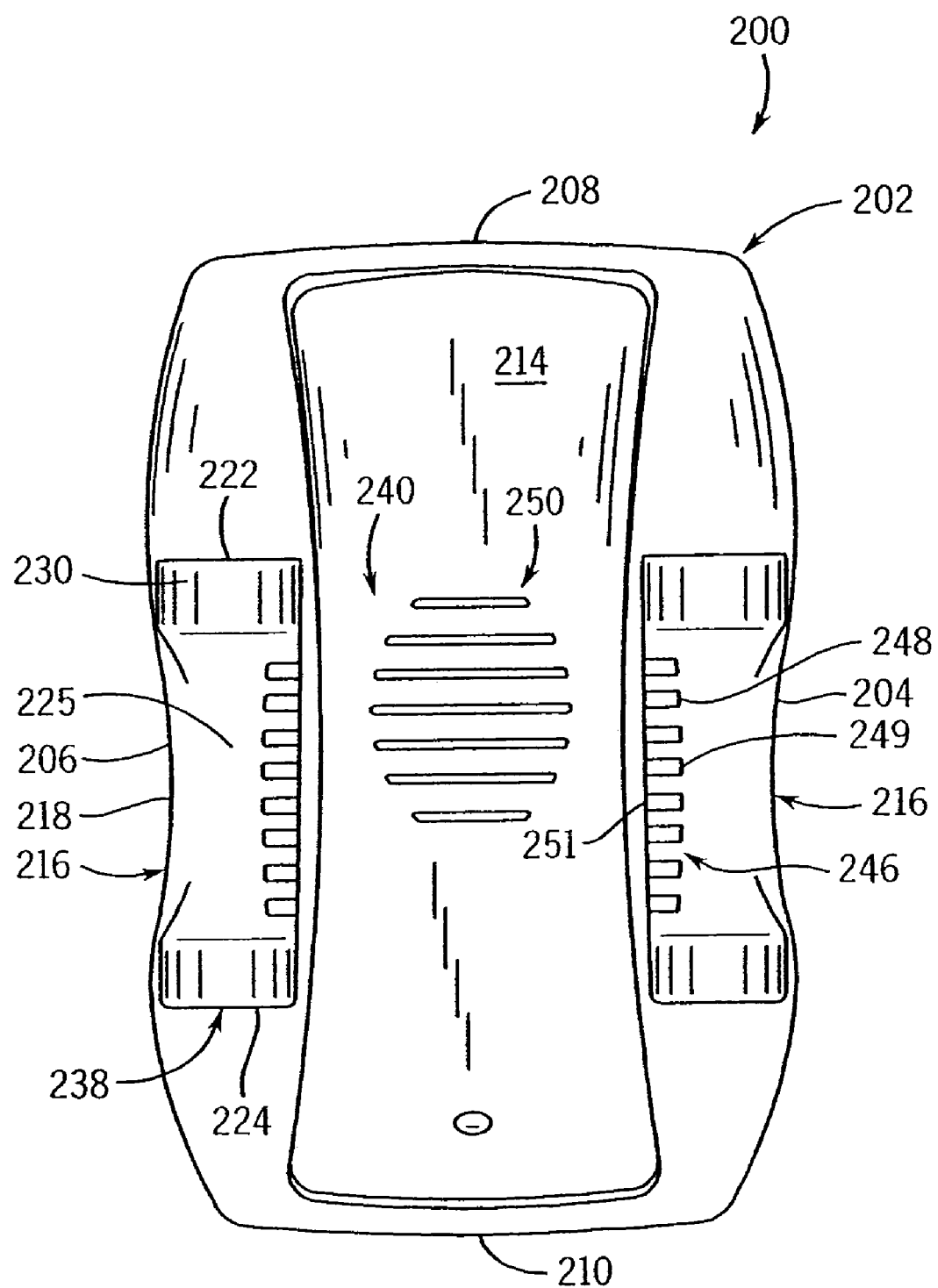
FIG. 7 is a top plan view of a charger having an air moving system and thermal cutoff system constructed in accordance with an alternate embodiment of the invention.

One such alternate configuration is illustrated in FIG. 7 having reference numerals corresponding to like elements of the previous embodiment incremented by 100, unless otherwise stated, for the purposes of clarity and convenience. In particular, a vertically extending charger 200 is illustrated having a housing 202 defined by vertically extending side walls 204 and 206, horizontally extending upper and lower end walls 208 and 210, respectively, vertically extending rear wall (not shown), and vertically extending front wall 214. A standard electrical plug (not shown) extends transversely outwardly from the housing 202 that is received by a conventional electrical receptacle. Charger 200 is thus configured to be wall-mounted such that the rear wall faces the mounting surface, and front wall 214 extends transversely outwardly from the wall during use.

A pair of vertically extending voids is formed in the front wall 214 at a location proximal side walls 204 and 206 that provides a corresponding pair of battery compartments 216. Each battery compartment 216 includes a vertically extending groove 218 that is sized to receive a rechargeable battery. Each groove 218 is defined by a first positive end wall 222 and a second negative end wall 224, and a base 225 whose upper surface defines a cradle shaped to conform to the cylindrical outer wall of the battery. A plastic or other nonconductive plug 230 extends into each groove 218 from positive end wall 222 as described above with reference to charger 100. The charger 200 further includes a temperature increase rate measurement system as described above.

In order to reduce the excessive temperatures that are typically associated with cells during charging, charger 200 includes an air moving system 240 that circulates cool ambient air through battery compartment 216. In particular, an air intake vent 246 is disposed in each compartment 216, and includes a plurality of horizontal slots 248 that extend through base 225. Slots 248 are vertically stacked, and extend substantially along the entire length of the groove 218. A portion of each slot 248 is disposed beneath the battery, and a portion of each slot is disposed adjacent the battery. Slots 248 define a first end 249 that faces a outwardly direction transverse to the charger 200, and a second end 251 that faces a direction generally parallel to the direction of upper and lower walls 208 and 210. An air outlet vent 250 includes a plurality of slots 252 that extend horizontally through the front wall 214 of the charger 200. The interior of charger 200 is sufficiently hollow so as to provide an internal conduit between vents 246 and 250.

A forced air source (not shown) is disposed inside the charger 200 at any location suitable to force air disposed inside the housing 202 out of the housing via vent 250. The expulsion of air from vent 250 causes suction that forces cool ambient air into the housing 202 via vents 246. Vents 246 are positioned to force ambient air to flow around the circumference of each cell. Air thus flows from vents 246 and through housing 202, and exits the charger 200 at vent 250. Because vents 246 are disposed adjacent the batteries, the batteries are air-cooled. The air moving system 240 thus prevents hot air from accumulating around the individual cells being charged, and thus extends the charge capacity of the cell.

Charger 200 can alternatively be constructed in accordance with all of the alternatives discussed above with reference to charger 100. It should furthermore be appreciated that the benefits of the disclosed air moving systems can be obtained in a charger that does not terminate charging based on rate of temperature increase, and for that matter, that does not include a thermistor for cell temperature measurement.

The above description has been that of the preferred embodiment of the present invention, and it will occur to those having ordinary skill in the art that many modifications may be made without departing from the spirit and scope of the invention. In order to apprise the public of the various embodiments that may fall in the scope of the present invention, the following claims are made.

We claim:

1. A charger of the type that delivers a charge to an electrochemical cell, the charger comprising:
    a controller;
    at least one battery compartment that receives the electrochemical cell, the battery compartment including:
        a positive charge contact engaging a positive cell terminal of the electrochemical cell;
        a negative charge contact engaging a negative cell terminal of the electrochemical cell; and
        a thermistor engaging the negative cell terminal at a position remote from the negative charge contact, wherein the thermistor provides data output to the controller for determining a temperature rate increase of the cell.

2. The charger as recited in claim 1, wherein the thermistor provides data output to the controller for detecting a temperature rate increase of the cell.

3. The charger as recited in claim 2, wherein the controller is in communication with the charge contacts and terminates cell charging when the thermistor indicates a measured cell temperature increase rate beyond a predetermined rate.

4. The charger as recited in claim 3, wherein the predetermined rate is between 1 and 5 degrees C. per minute.

5. The charger as recited in claim 4, wherein the predetermined rate is substantially 2 degrees C. per minute.

6. The charger as recited in claim 3, wherein the controller is configured to apply a maintenance charge to the cell after cell charging has been terminated.

7. The charger as recited in claim 2, further comprising a resilient support member disposed inside the battery compartment biasing the thermistor into engagement with a negative end of a cell disposed in the battery compartment.

8. The charger as recited in claim 2, wherein the charger further comprises a housing, wherein the controller and battery compartment are disposed in the housing.

9. The charger as recited in claim 2, wherein the thermistor is offset from the negative charge contact a distance of at least 0.5 mm.

10. The charger as recited in claim 2, further comprising an air moving system including an air mover that causes ambient air to be delivered to the electrochemical cell.

11. The charger as recited in claim 10, wherein the air moving system further comprises a vent disposed proximal the electrochemical cell that receives the ambient air.

12. The charger as recited in claim 11, wherein the air mover creates a negative pressure at the vent to draw ambient air around the cell.

13. A charger of the type that delivers a charge to an electrochemical cell, the charger comprising:
   a housing;
   at least one battery compartment disposed in the housing that receives the electrochemical cell wherein the battery compartment includes a positive charge contact and a negative charge contact;
   a controller;
   a thermistor located within the battery compartment at a position remote from the negative charge contact; and
   an air moving system including a vent disposed proximal the electrochemical cell, and a forced air source that draws ambient air into the vent.

14. The charger as recited in claim 13, wherein the positive charge contact engages a positive cell terminal, and the negative charge contact engages a negative cell terminal.

15. The charger as recited in claim 14, wherein the thermistor provides data output to the controller for determining a temperature rate increase of the cell.

16. The charger as recited in claim 15, wherein the controller is in communication with the positive charge contact and the negative charge contact and terminates cell charging when the thermistor indicates a measured cell temperature increase rate beyond a predetermined rate.

17. The charger as recited in claim 16, wherein the predetermined rate is between 1 and 5 degrees C. per minute.

18. The charger as recited in claim 17, wherein the predetermined rate is substantially 2 degrees C. per minute.

19. The charger as recited in claim 16, wherein the controller is configured to apply a maintenance charge to the cell after cell charging has been terminated.

20. The charger as recited in claim 16, further comprising a resilient support member disposed inside the battery compartment biasing the thermistor into engagement with a negative end of a cell disposed in the battery compartment.

21. The charger as recited in claim 13, wherein the controller is disposed in the housing.

22. The charger as recited in claim 15, wherein the thermistor is offset from the negative charge contact a distance of at least 0.5 mm.

23. The charger as recited in claim 13, wherein the forced air source pushes air out of the vent.

24. A method for determining a charge termination point, the method comprising:
   connecting a positive positive cell terminal and a negative cell terminal of an electrochemical cell to a positive charge contact and a negative charge contact, respectively, of a battery charger;
   applying a charge to the cell via the positive charge contact and the neciative charge contact;
   measuring a cell temperature at the negative cell terminal of the cell using a thermistor engaging the negative cell terminal, wherein the thermistor is located at a position within a battery compartment of the battery charger remote from the negative charge contact; and
   discontinuing the applied charge when a cell temperature increase rate greater than a predetermined threshold is measured.

25. The method as recited in claim 24, further comprising the step of coupling a controller to the thermistor, the positive charge contact and the negative charge contact, and causing the controller to discontinue the applied charge when a cell temperature increase rate greater than a predetermined threshold is measured.

26. The charger as recited in claim 24, further comprising biasing the thermistor into engagement with the negative cell terminal of the cell.

27. The charger as recited in claim 24, wherein the predetermined threshold is between 1 and 5 degrees C. per minute.

28. The charger as recited in claim 27, wherein the predetermined threshold is substantially 2 degrees C. per minute.

29. The charger as recited in claim 24, further comprising applying a maintenance charge to the cell after discontinuing the applied charge when a cell temperature increase rate greater than a predetermined threshold is measured.

30. A method of cooling a rechargeable electrochemical cell in a battery charger, the method comprising:
   placing the rechargeable electrochemical cell comprising a positive cell terminal and a negative cell terminal in the battery charger, the battery charger comprising a controller and at least one battery compartment that receives the rechargeable electrochemical cell, the battery compartment comprising a positive charge contact engaging the positive cell terminal; a negative charge contact engaging the negative cell terminal; a thermistor engaging the negative cell terminal at a position remote from the negative charge contact, wherein the thermistor provides data output to the controller for determining a temperature rate increase of the cell; and air-moving means attached to at least a portion of the battery charger; and
   moving air across at least a portion of the electrochemical cell by said air-moving means, thereby cooling the rechargeable electrochemical cell.

* * * * *

UNITED STATES PATENT AND TRADEMARK OFFICE
CERTIFICATE OF CORRECTION

PATENT NO. : 7,372,237 B2
APPLICATION NO. : 10/885368
DATED : May 13, 2008
INVENTOR(S) : Bushong et al.

It is certified that error appears in the above-identified patent and that said Letters Patent is hereby corrected as shown below:

In the Specification, column 5, line 38, delete "finction" and insert therefor -- function --.

In Claim 13, column 11, line 8, before "at a position" insert therefor -- and engaging the negative cell terminal --.

In Claim 24, column 11, line 51, delete "a positive positive cell" and insert therefor -- a positive cell --.

In Claim 24, column 12, line 4, delete "neciative" and insert therefor -- negative --.

Signed and Sealed this

Thirtieth Day of June, 2009

JOHN DOLL
*Acting Director of the United States Patent and Trademark Office*